(12) United States Patent  (10) Patent No.: US 8,373,678 B2
Yamada  (45) Date of Patent: Feb. 12, 2013

(54) ELECTRONICS DEVICE HAVING PROJECTOR MODULE

(75) Inventor: Masafumi Yamada, Kawasaki (JP)

(73) Assignee: Ricoh Company, Limited, Tokyo (JP)

( * ) Notice: Subject to any disclaimer, the term of this patent is extended or adjusted under 35 U.S.C. 154(b) by 987 days.

(21) Appl. No.: 12/416,281

(22) Filed: Apr. 1, 2009

(65) Prior Publication Data

US 2009/0262098 A1  Oct. 22, 2009

(30) Foreign Application Priority Data

Apr. 21, 2008  (JP) .................................. 2008-110496

(51) Int. Cl.
G06F 3/02 (2006.01)
(52) U.S. Cl. ...................................................... 345/175
(58) Field of Classification Search ........................ None
See application file for complete search history.

(56) References Cited

U.S. PATENT DOCUMENTS

| | | | |
|---|---|---|---|
| 5,525,764 A | 6/1996 | Junkins et al. | |
| 5,867,795 A * | 2/1999 | Novis et al. | 455/566 |
| 6,750,849 B2 | 6/2004 | Potkonen | 345/168 |
| 6,911,972 B2 * | 6/2005 | Brinjes | 345/175 |
| 7,071,924 B2 * | 7/2006 | Wilbrink et al. | 345/168 |
| 7,307,661 B2 * | 12/2007 | Lieberman et al. | 348/333.1 |
| 7,369,584 B2 | 5/2008 | Goldman et al. | |
| 7,896,499 B2 * | 3/2011 | Noba | 353/28 |

| | | | |
|---|---|---|---|
| 2004/0246338 A1 | 12/2004 | Lieberman et al. | |
| 2005/0128183 A1 | 6/2005 | McGreevy | |
| 2006/0289760 A1 | 12/2006 | Bathiche | |

FOREIGN PATENT DOCUMENTS

| | | |
|---|---|---|
| EP | 0 982 676 B1 | 10/2008 |
| JP | 2005-165804 | 6/2005 |
| JP | 2007-53420 | 3/2007 |
| JP | 2007-133835 | 5/2007 |
| JP | 2007-219966 | 8/2007 |
| JP | 2007-528023 | 10/2007 |
| JP | 2007-310194 | 11/2007 |
| JP | 2008-9136 | 1/2008 |
| JP | 2009-3281 | 1/2009 |

\* cited by examiner

*Primary Examiner* — K. Wong
(74) *Attorney, Agent, or Firm* — Oblon, Spivak, McClelland, Maier & Neustadt, L.L.P.

(57) ABSTRACT

An electronics device having a projector module including a first light source, and a first scanner scanning an image projection surface in a biaxial direction; a distance measuring device performing one-dimensional scanning on a plane over the image projection surface to determine the position of an optical interceptor and including a second light source, a second scanner performing scanning with the second light beam, and a light detector detecting the second light beam reflected from the optical interceptor; and a controller. The uniaxial-scanning component of the first scanner is shared with the second scanner. The positional data are compared with two-dimensional coordinate data of the projected image to determine the position of the optical interceptor on the projected image. The controller inputs a signal to the electronics device when determining that the optical interceptor performs optical interception on the projected image.

7 Claims, 14 Drawing Sheets

SMALL AREA IS DETECTED
= NOT IDENTIFIED AS FINGER

PREDETERMINED AREA IS DETECTED
= IDENTIFIED AS FINGER

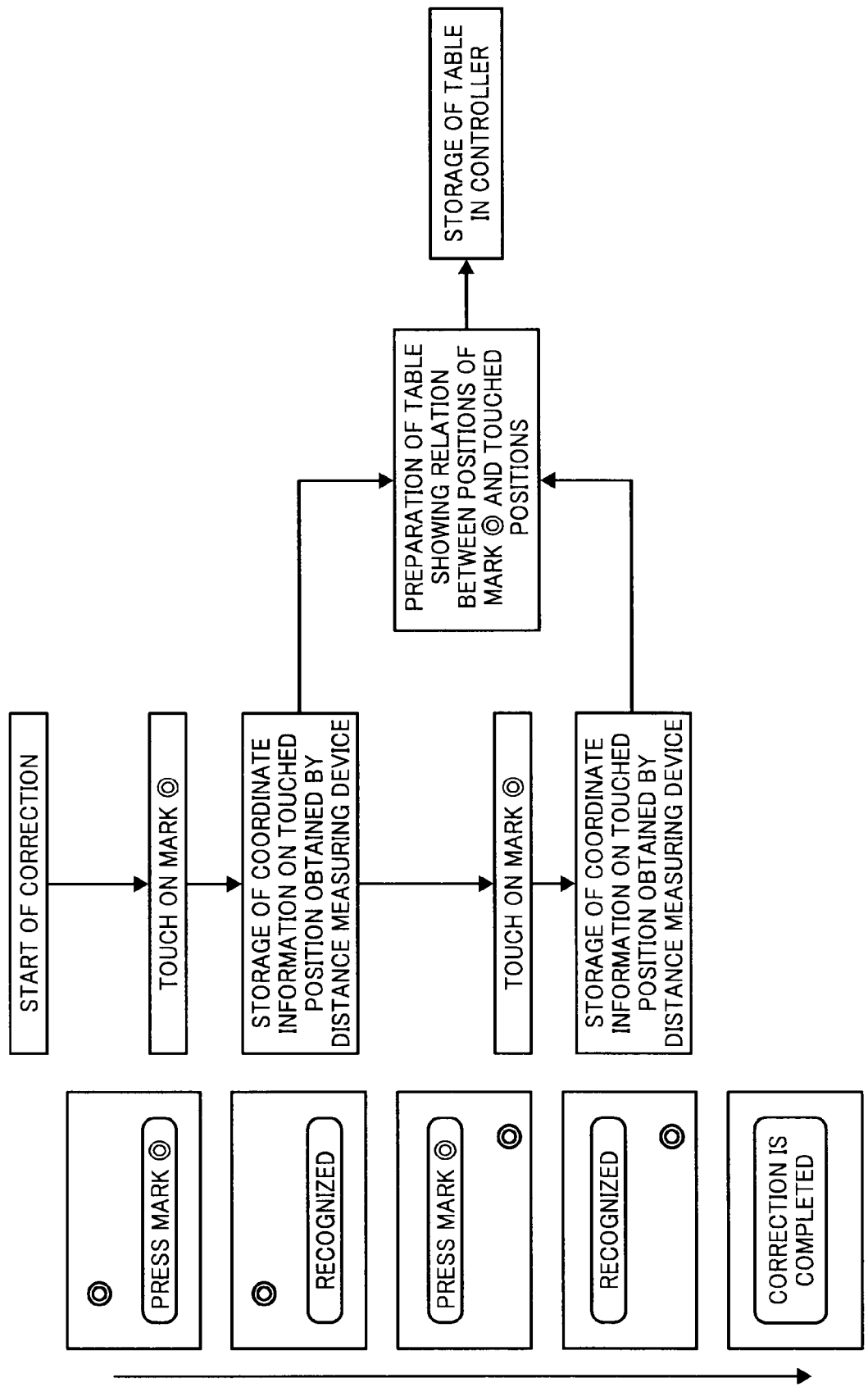

ELECTRONICS DEVICE HAVING PROJECTOR MODULE

BACKGROUND OF THE INVENTION

1. Field of the Invention

The present invention relates to an electronic device having a projector module. Particularly, the present invention relates to an electronics device having a projector module capable of performing desktop projection.

2. Discussion of the Background

Use of projectors as tools for home theaters and meetings using personal computers is rapidly spreading. Recently, small portable projectors to be used in combination with notebook computers have been developed. Such portable projectors are preferably used for meetings (such as presentations) held at a room having no projector.

Under such circumstances, there are movements such that a projector is incorporated in electronics device such as mobile phones. By incorporating a projector into such mobile electronics devices, the convenience of the devices can be dramatically enhanced.

Such mobile electronics devices having a projector are considered to be used as follows. If a person has a mobile phone having a projector module, the person will project an image on a plane (such as wall or desktop) while holding the phone with a hand. In this case, there are problems to be solved such that the image is blurred due to hand movement, and the hand is damaged by heat generated by the phone. Therefore, such a mobile phone will be typically used by being set on an installation surface such as desktops. If such a mobile phone is set on a desk, it will be typical that an image is projected on a vertical screen. In this case, if the projector module is small and has a low output power, the vertical screen has to be set near the mobile phone.

Alternatively, it is possible to project an image on the desk on which the mobile phone is set. FIG. 17 illustrates a mobile phone projecting an image on a desk on which the mobile phone is set. Since this projection method uses no screen, the method can be preferably used for small-size conference rooms. In addition, since an image is projected on a place near the projector module, the output power of the projector module can be decreased.

In such a projection system, the operating portion (such as operation buttons) of the electronics device (mobile phone) in which the projector module is set will be used as an interface for manipulating output images. However, the method has the following drawbacks. Specifically, it is difficult to operate the operating portion of such an electronics device without moving the device itself. If the device is moved by an operation, the image is also moved during the operation and therefore it is difficult to watch a projected image. In addition, since such an electronics device is small in size, heat generated by the projector module will be transmitted to the operating portion. Therefore, it is necessary to solve the problems.

Thus, it is inconvenient to perform an image projection operation using the electronics device itself. It is considered to use a remote controller for such an image projection operation, but an electronics device in combination with a remote controller is inferior in mobility and cost.

Therefore, it will be most preferable to perform an operation by directly touching a portion of the projected image (the method is hereinafter referred to as a projected image touching method). In this case, the electronics device needs to have a module detecting that the predetermined portion of the projected image is touched with a finger or the like. By using such a module, whether the predetermined portion of an image projected on a plane is touched can be determined.

Published unexamined Japanese patent applications Nos. (hereinafter referred to as JP-As) 2007-219966, 2007-133835 and 2005-165804 have disclosed input devices using such a projected-image touching method. These devices relate to inputting using a virtual keyboard, which has been commercialized and in which a keyboard image is projected on a desk. When a key of the keyboard image is touched, the touched key can be identified by a reading sensor provided in the electronics devices. These devices can project only a keyboard pattern can be projected. Specific examples of the projector of the electronics devices include projectors in which a laser beam irradiates a special diffraction grating to form a keyboard pattern image. The keyboard pattern image changes depending on the pattern of the diffraction grating. From this point of view, the projectors are different from data projectors.

Read sensors for determining what key is pushed in such a virtual keyboard typically have the configuration as illustrated in FIG. 18. Referring to FIG. 18, an infrared laser 62 emits an infrared laser beam while performing scanning on a plane (i.e., infrared ray plane) located slightly above a surface 61 of a desk on which a keyboard image is projected by a projector module 60. If an operator sets a finger so as to touch a key of the projected keyboard image, the infrared laser beam is reflected by the set finger. The thus reflected infrared laser beam is detected with an infrared ray sensor 63 (such as CCD cameras) provided at a position above the infrared ray plane. The key touched by the finger can be determined depending on the position of the light receiving portion of the CCD cameras receiving the reflected infrared laser beam.

The devices disclosed in JP-As 2007-219966, 2007-133835 and 2005-165804 need to have an infrared laser source, an element for converting the laser beam so as to have a planar profile, and a two-dimensional CCD camera for detecting the reflected laser beam. Therefore, the devices need to have two optical windows, one of which is used for emitting an infrared laser beam and the other of which is used for the CCD camera receiving the reflected infrared laser beam. Therefore, appearance of the electronics devices (such as mobile phones) is not good.

JP-A 2007-053420 discloses an image processing device having the same reading function as the above-mentioned key reading function. However, the image projected by the device is not limited to a keyboard image. The image projection section of the device projects a two-dimensional image using a laser beam scanned by two polygon mirrors. The read sensor thereof is an independent module similarly to the devices using a virtual keyboard. Therefore, the device needs to have an infrared laser source, an element for converting the laser beam so as to have a planar profile, and a two-dimensional CCD camera for detecting the reflected laser beam. It is described therein that the laser beam converting element is a scanning member for scanning a laser beam, and polygon mirrors are exemplified as the scanning member.

The image processing device has to have three polygon mirrors, two of which are used for the image projecting section and one of which is used for the read sensor. Therefore, the image processing device has high costs.

Further, published Japanese translation (Kohyo No. 2007-528023) of a PCT application discloses a laser projection display, which scans a laser beam using a biaxial MEMS (Micro Electro Mechanical Systems) mirror and in which reading of a key of a virtual keyboard image is performed using an image capture. The laser projection display seems to have a low accuracy in detecting the height of a finger, namely the accuracy in determining whether a key of a virtual keyboard is pushed is low. Therefore, detection errors may often occur.

Image projection techniques similar to the technique disclosed in Kohyo No. 2007-528023, such that when a person steps on an image projected on a floor by a projector provided on a ceiling, the image is changed to another image have been used for amusement places, etc. Although the techniques have different principles, the typical principle is that when detecting a foot by its height using a three-dimensional image capture, the projected image is changed. Another principle is that an image of an object is caught by a CCD sensor, and the pixels of the CCD sensor are analyzed to determine the distance between the sensor and the object for every pixels using a TOF (Time of Flight) method, thereby obtaining three dimensional data of the object. The accuracy in measuring a distance by this method is insufficient for determining the height of a foot (determining the height of a foot is a severe distance measuring operation). Thus, the technique has low detection accuracy.

A variety of patent applications have disclosed projectors equipped with a distance measuring sensor. Almost all the projectors use a technique such that the distance between the screen and the projector is detected, and then a key stone correction is made.

Because of these reasons, a need exists for an electronics device in which an inputting operation is performed by a projected image touching method with a high degree of reliability and which has good appearance and low costs.

SUMMARY OF THE INVENTION

As an aspect of the present invention, an electronics device is provided, which includes:
a projector module configured to project a two-dimensional image and including:
  a first light source configured to emit a first laser beam selected from monochromatic laser beams and multichromatic laser beams; and
  a first scanner configured to scan an image projection surface with the first laser beam in a biaxial direction to project the two-dimensional image on the image projection surface and including:
    a uniaxial-scanning component rotatable on one axis; and
    a biaxial-scanning component rotatable on two axes;
a distance measuring device configured to perform one-dimensional scanning to measure a distance to an object (i.e., an optical interceptor such as fingers) and including:
  a second light source configured to emit a second light beam;
  a second scanner configured to perform the one-dimensional scanning using the second light beam, wherein the uniaxial-scanning component of the first scanner is shared with the second scanner; and
  a light detector configured to detect the second light beam reflected from the optical interceptor; and
a controller.

In this electronics device, the scanning plane defined by the second light beam scanning direction and the second light beam traveling direction is parallel to the image projection surface while covering at least the entire two-dimensional image. The distance data obtained by the distance measuring device are two-dimensional coordinate data in the second light beam scanning direction and the second light beam traveling direction, and are compared with two-dimensional coordinate data of the projected two-dimensional image to determine the position of the optical interceptor on the projected image. The controller inputs a signal to the electronics device when determining that the optical interceptor performs optical interception (such as touching) in a portion of the projected two-dimensional image, which portion has an area not less than a predetermined area, for a time not shorter than a predetermined time.

BRIEF DESCRIPTION OF THE DRAWINGS

Various other objects, features and attendant advantages of the present invention will be more fully appreciated as the same becomes better understood from the detailed description when considered in connection with the accompanying drawings in which like reference characters designate like corresponding parts throughout and wherein:

FIGS. 11 and 12 are flowcharts for explaining examples of the correction operation of the electronics device;

DETAILED DESCRIPTION OF THE INVENTION

The present invention relates to an electronics device having a projector module projecting an image on a projection surface such as desktop. Specific examples of the electronics device include projectors themselves, mobile phones, notebook computers, personal digital assistants (PDAs), game machines, digital cameras, etc. The present invention is preferably used for mobile electronics devices, but is not limited thereto.

A first example of the electronics device of the present invention will be explained by reference to FIGS. 1 to 12.

Figure 1A:
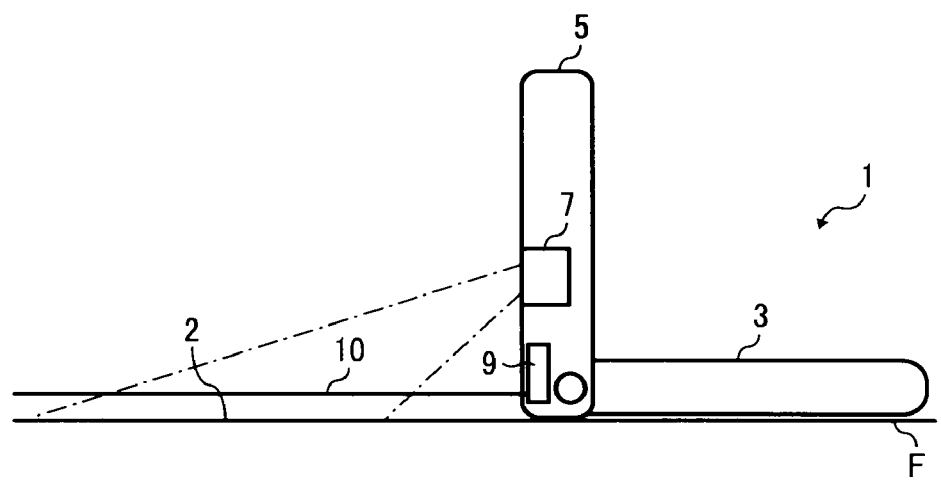
FIGS. 1A and 1B are views illustrating an example (mobile phone) of the electronics device of the present invention, which projects an image on a desk.
Figure 1B:
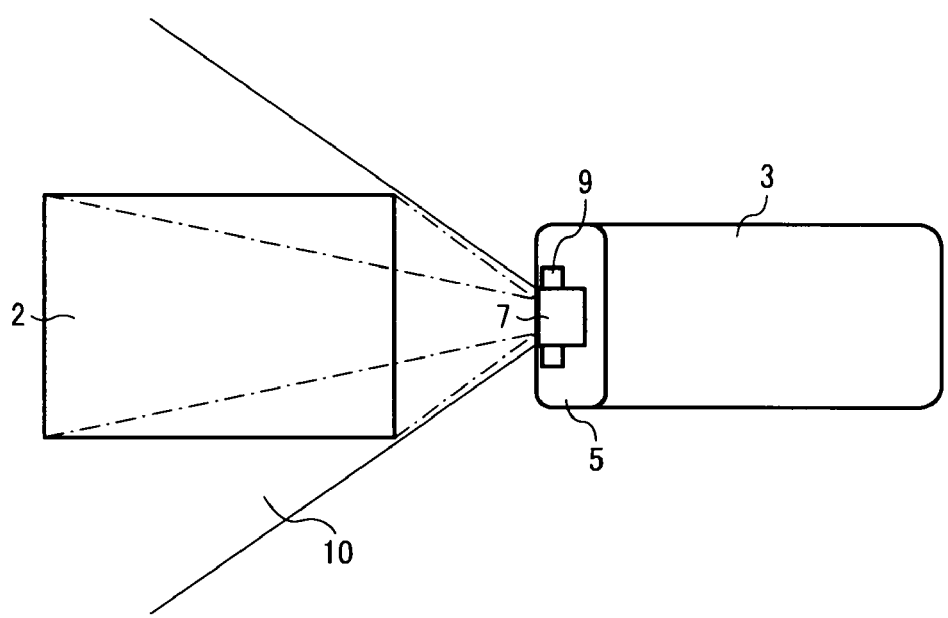
Figure 2:
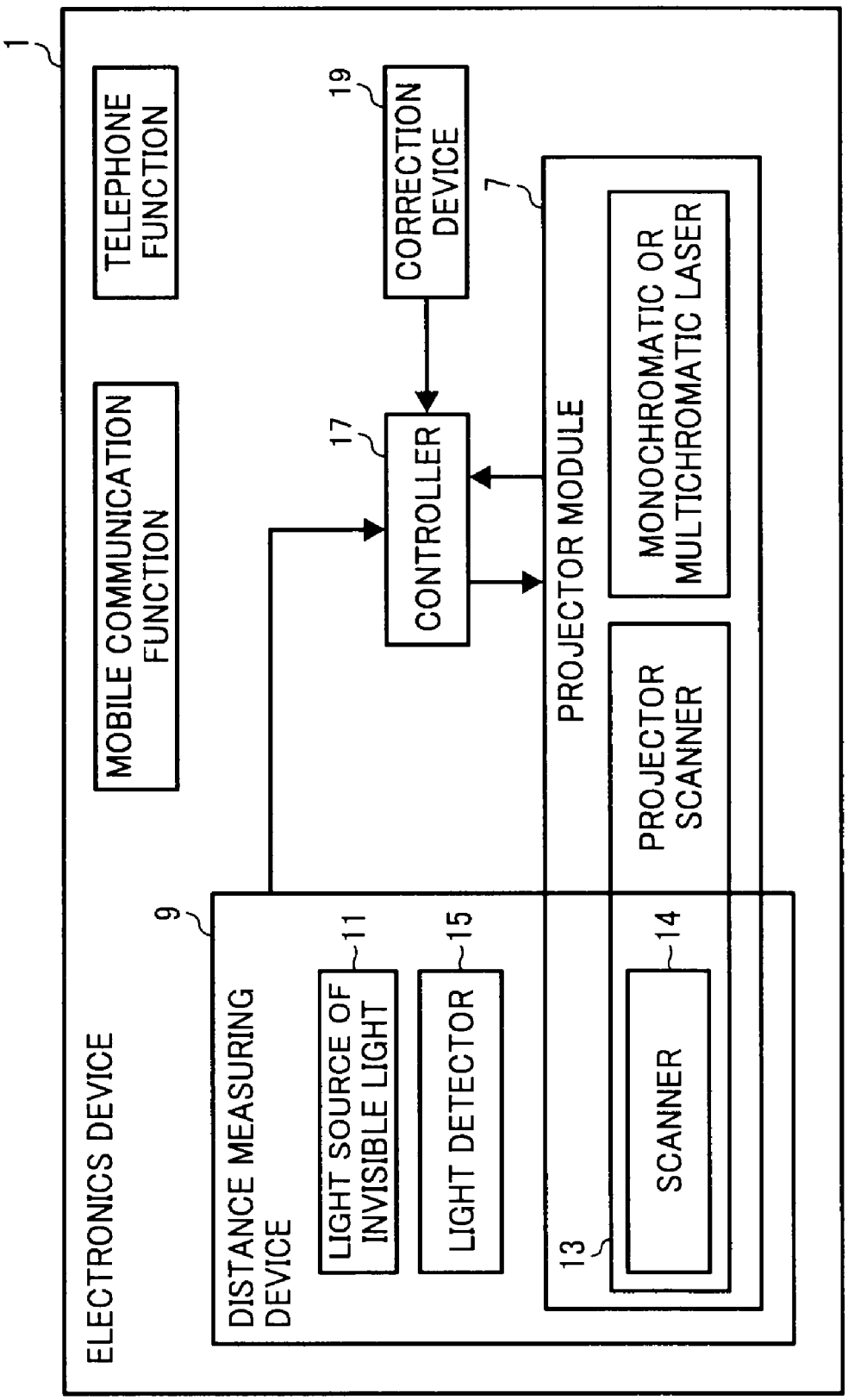
FIG. 2 is a block diagram of the electronics device illustrated in FIG. 1.

FIGS. 1A and 1B schematically illustrate the layout of a mobile phone according to an example of the present invention, and FIG. 2 is the block diagram of the mobile phone.

Referring to FIGS. 1A and 1B, a mobile phone 1 is a flip phone having a lower portion 3 having a telephone function and including operational keys, and an upper portion 5 including a display. As illustrated in FIGS. 1A and 1B, the mobile phone 1 is used in such a manner that the lower portion 3 is set on an installation surface F (such as desktop) while the upper portion 5 stands substantially vertically to project an image 2 on the installation surface F.

The upper portion 5 includes a projector module 7, which projects an image on the same surface (hereinafter sometimes referred to as image projection surface or projected image plane) as the installation surface F (i.e., installation surface projection). In addition, the upper potion 5 includes a distance measuring device 9, which is located near the installation surface F.

Figure 3:
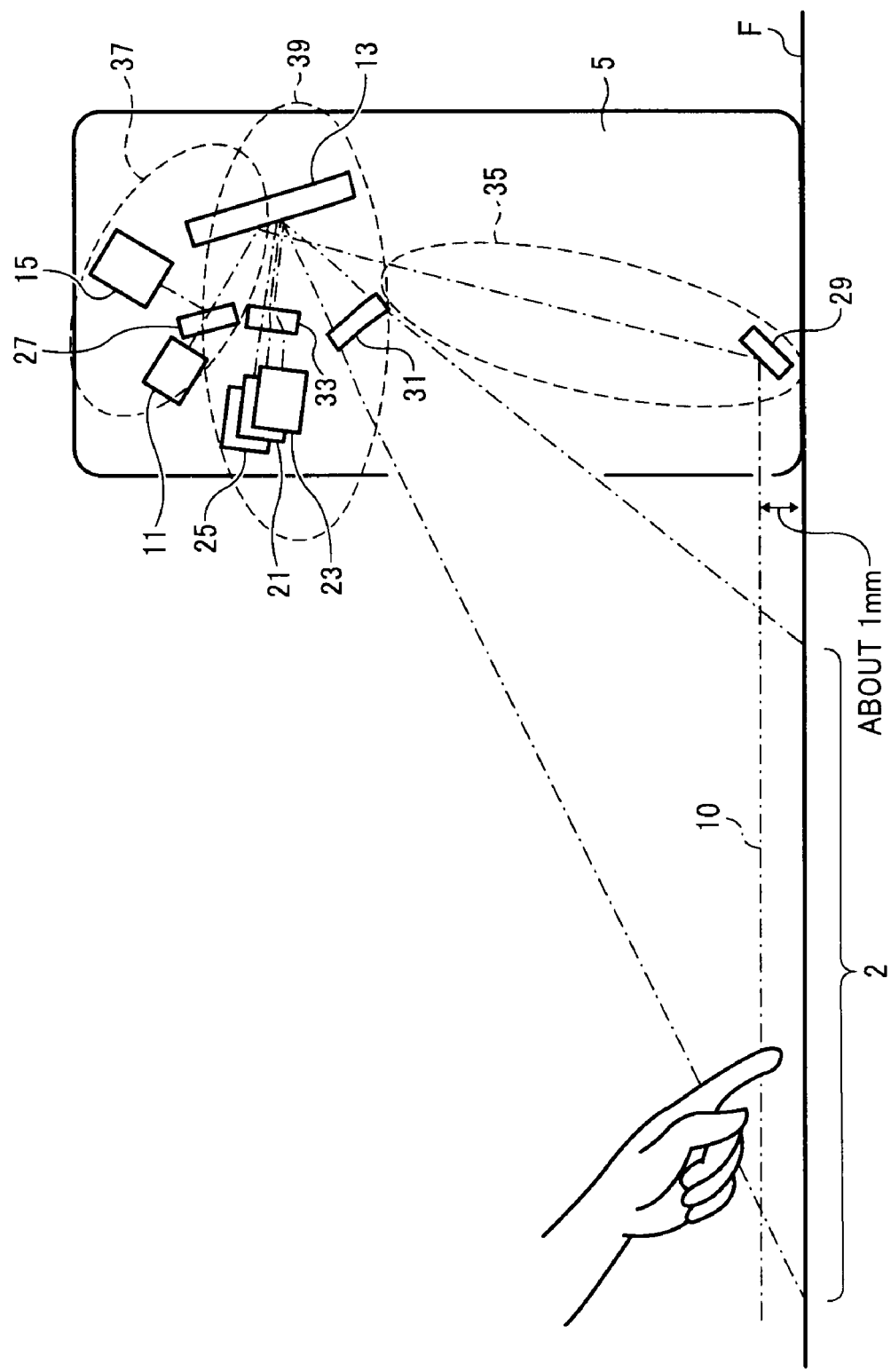
FIG. 3 is a cross sectional view of the electronics device.

The distance measuring device 9 performs one-dimensional scanning on a plane (a scanning plane 10) parallel to and close to the projected image plane using a portion of a MEMS (Micro Electro Mechanical Systems) mirror 13, which is illustrated in FIG. 3 and which serves as a scanner performing scanning using an invisible laser beam (e.g., an infrared laser beam) emitted by an infrared laser 11 (illustrated in FIG. 3). Laser light reflected from an object (e.g., a finger illustrated in FIG. 3, hereinafter sometimes referred to as an optical interceptor) is detected by a photodiode 15 (illustrated in FIG. 3) serving as a light detector. The waveforms (pulses) of the emitted laser light and the reflected laser light are compared with each other to determined the time difference therebetween, thereby determining the distance between the object (optical interceptor) and the mobile phone 1 using a Time of Flight (TOF) method. The configuration of the mobile phone 1 is explained later in detail by reference to FIG. 3.

Figure 6:
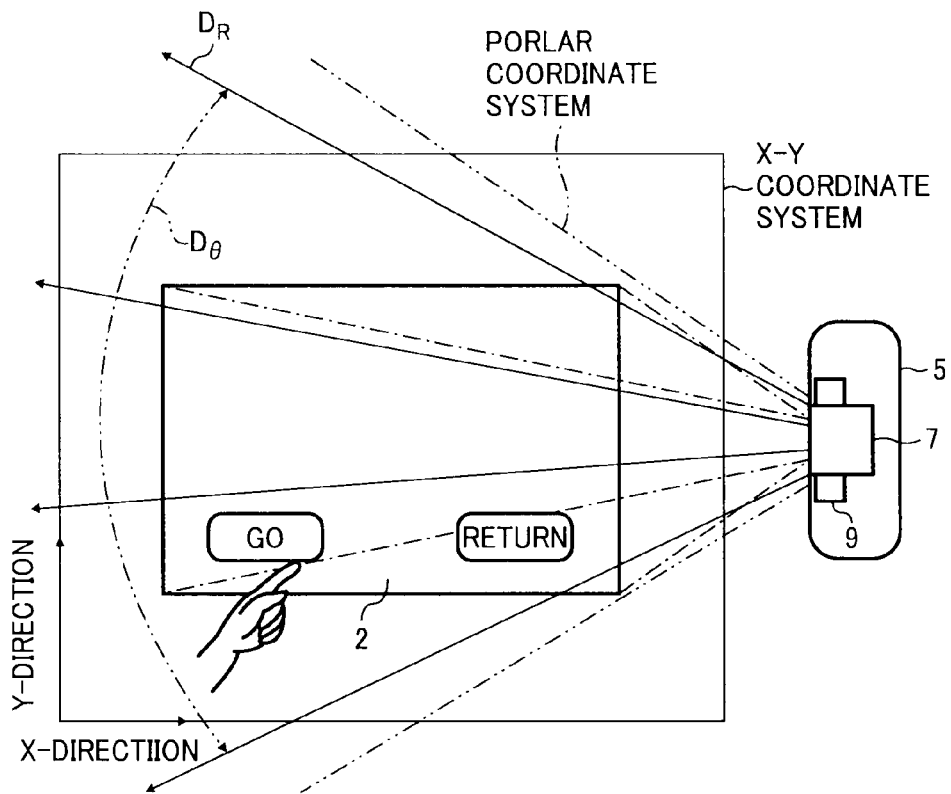
FIG. 6 is a plan view of the electronics device for explaining how the distance measuring device performs scanning.

Thus, scanning using a laser beam is performed (as illustrated in FIG. 6) and thereby the angle component of the object on the scanning plane can be specified using a two-dimensional coordinate system. In addition, the distance to the object can be determined by the distance measuring device 9, and thereby the position of the object in the radial direction (i.e., the laser beam traveling direction) can be specified using the two-dimensional coordinate system. Thus, the position of the object on the scanning plane can be specified using the two-dimensional coordinate system.

FIG. 2 is a block diagram of the first example (mobile phone) of the electronics device. As mentioned above, the distance measuring device 9 includes the infrared laser 11 serving as a light source emitting invisible light, a scanner 14 (i.e., a portion of the MEMS mirror 13), the photodiode 15, etc. In this regard, the MEMS mirror 13 also serves as a projector scanner of the project module 7, i.e., another portion of the MEMS mirror 13 serves as a projector scanner of the project module 7.

The projector module 7 includes at least a laser emitting a monochromatic laser beam or a multichromatic laser beam, and a projector scanner (i.e., the MEMS mirror 13). As mentioned above, a portion of the projector scanner is used as the scanner of the distance measuring device 9.

As mentioned above, the distance measuring device 9 specifies the position of the object on the scanning plane (two-dimensional coordinate) using a polar coordinate system.

A controller 17 compares the thus obtained positional information (two-dimensional coordinates) of the object with the image projected by the projector module 7 to determine the position of the projected image corresponding to the position of the object (i.e., to determine which portion of the projected image the object touches). Thus, the controller 17 has at least a function of controlling the operations of the mobile phone 1 (e.g., output of the projector) according to the thus obtained information (i.e., information on the position of the portion of the projected image touched by the object).

A correction device 19 clarifies the standards used for judging position of the portion of the projected image corresponding to the position of the object. Although the specific correction method will be explained later in detail, the basis of the technique is that the position of the object is matched with the image projected by the projector module while referring to a matching table stored in the controller 17. When a difference arises therebetween, the correction device 19 has to perform correction on the matching table.

As illustrated in FIG. 2, the mobile phone 1 also has a block of a mobile communication function (i.e., wireless communication function) and a block of a telephone function. By incorporating the above-mentioned functions, excellent usability can be imparted to the mobile phone 1. For example, by projecting images on a table using the above-mentioned function of the mobile phone 1, an effective meeting can be performed even in a small meeting space. In addition, since the mobile phone has the distance measuring device 9 and the mobile communication function, the mobile phone has good operationality.

Next, the components of the mobile phone 1 and operations thereof will be explained in detail.

FIG. 3 illustrates the upper portion 5 of the mobile phone 1. At first, the projector module 7 will be explained.

Among various projectors, a laser scanning projector is preferably used for this example (mobile phone 1) of the electronics device of the present invention. Therefore, the laser scanning projector will be explained.

The laser scanning projector uses a laser as a light source. When the laser is a monochromatic laser emitting one monochromatic light beam, the projector is a monochromatic projector. When the laser is a multichromatic laser emitting plural color laser beams (such as red (R), green (G) and blue (B) color laser beams), the projector is a multi-color (full color) projector.

In this example, a red (R) laser 21, a green (G) laser 23, and a blue (B) laser 25 are used for the projector module 7. Since data projectors are typically used recently, a full color projector is preferably used because of having a high commercial value. However, the light source is not limited thereto, and a monochromatic laser can also be used for the projector module 7.

The projector module 7 is preferably as small as possible in size so as to be used for mobile electronics devices (such as mobile phones). Therefore, it is preferable to use a laser diode as a light source of the projector module, which is constituted of a small-sized element. At the present time, red and blue laser diodes have been commercialized, but there are no green laser diodes. Therefore, a device using a second harmonic generation generator (SHG), which has a relatively small size, is used for a green light source. Needless to say, when a green laser diode is commercialized, such a green laser diode may be used for the light source.

The MEMS mirror 13A two-dimensionally scans a laser beam emitted by the light source, thereby forming a two-dimensional image 2 on the surface F of the desk. Therefore, the laser beams have to be modulated according to the respective image information. Since laser diodes can be modulated without using any other device, modulation of red and blue laser beams has no problem. However, the SHG device cannot be directly modulated, and therefore external modulation using an accoustooptical modulator (AOM) has to be performed on the green light source. Needless to say, when a green laser diode is commercialized, it will be unnecessary to perform such external modulation.

In FIG. 3, numerals 27 and 29 respectively denote a beam splitter and a reflecting mirror, and numerals 31 and 33 denote optical elements. In addition, numerals 35 and 37 denote distance measuring device blocks, and numeral 39 denotes a projector module block.

Figure 4:
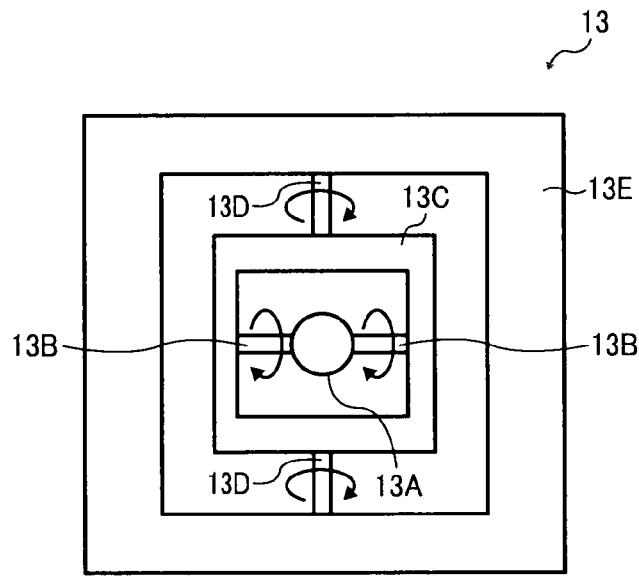
FIG. 4 illustrates a MEMS mirror serving as a projector scanner of the electronics device.
Figure 5:
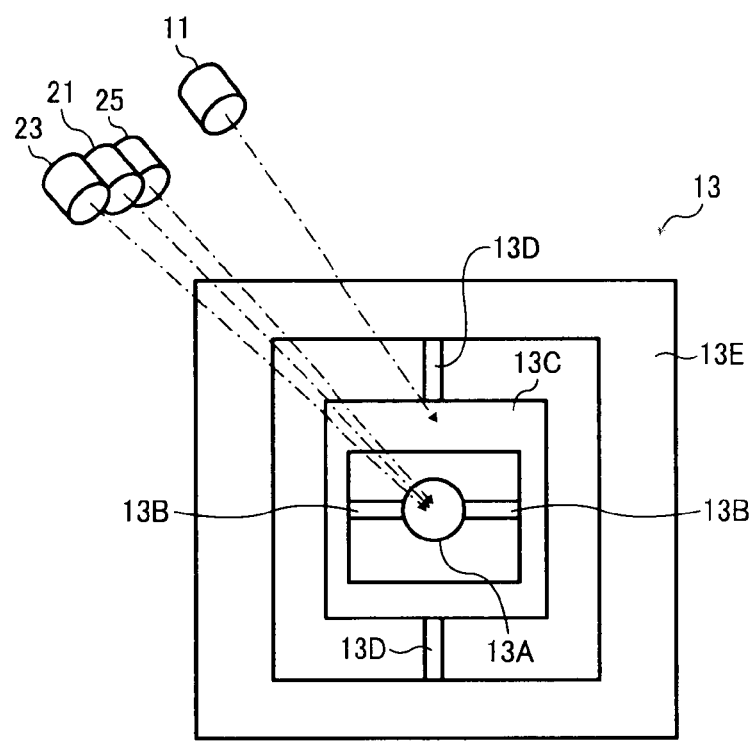
FIG. 5 is a view for explaining that the MEMS mirror also serves as a scanner (second scanner) of a distance measuring device of the electronics device.

The projector scanning device should perform two-dimensional scanning, and specific examples of the projector scanning device include MEMS mirrors. FIG. 4 illustrates a typical example of the MEMS mirror 13. The MEMS mirror 13 illustrated in FIG. 4 has a main mirror portion 13A, which is supported by two first mirror supports 13B. The first mirror supports 13B connect the main mirror 13A with a first mirror flame 13C.

The main mirror portion 13A is rotatable on the first mirror supports 13B relative to the first mirror flame 13C. The first mirror flame 13C is supported by second mirror supports 13D, and is rotatable on the second mirror supports 13D relative to a main flame 13E.

Since the first mirror supports 13B are perpendicular to the second mirror supports 13D, the main mirror portion 13A is rotatable in biaxial directions relative to the main flame 13E. These members (13A-13E) are made of one plate, and therefore the mirror supports 13B and 13D have elasticity. Although a term "rotatable" is used above, strictly speaking the members 13A and 13C are rotatable within the elasticity range of the elastic member constituting the MEMS mirror 13. Therefore, the MEMS mirror 13 has a character frequency. When an external force is applied to the MEMS mirror 13, the mirror causes resonance at the character frequency, thereby rotating the mirror at high amplitude. Specific examples of the devices applying an external force include magnet coils, piezoelectric devices, etc. Thus, laser scanning can be performed.

By using such elements, the projector module 7 can carry out a minimum function. However, by additionally using other elements and devices such as optical elements and image correction devices, high quality image projection can be performed.

Next, the distance measuring device 9 will be explained. In this example, a one-dimensional-scanning distance measuring device using a TOF method is used as the distance measuring device 9. The distance measuring device 9 includes, as constituent elements, an invisible light source, a scanner and a light detector. Suitable light sources for use as the invisible light source include infrared lasers. In this regard, it is needless to say that invisible light is preferably used for measuring a distance, and a laser diode is preferably used therefor because of having a small size. Referring to FIG. 3, one-dimensional scanning using laser light emitted from an infrared laser 11 is performed using a scanner. Since one-dimensional scanning is performed, for example, a uniaxial MEMS mirror is used for the scanner.

In this example, as illustrated in FIGS. 2 and 3, the projector scanner (MEMS mirror 13) also serves as the scanner of the distance measuring device. Since the projector scanner is the MEMS mirror 13, which is a biaxial scanner, it is improper to use the main mirror portion 13A for laser light scanning (uniaxial scanning) for the distance measuring device 9. Therefore, the first mirror flame 13C is used as the scanner of the distance measuring device 9. Thus, the scanner of the distance measuring device 9 can perform scanning only in a one-dimensional direction. Therefore, the first mirror flame 13C preferably has an area sufficient for performing laser scanning. As mentioned above, the distance measuring device 9 performs one-dimensional scanning within a plane parallel to the installation surface F (i.e., the image projection surface). Therefore, the MEMS mirror 13 is set such that the scanning direction of the first mirror flame 13C is parallel to the image projection surface.

By providing the reflecting mirror 29 (illustrated in FIG. 3), if necessary, it becomes possible to perform scanning in a fan-like form on a plane, which is parallel to and close to the image projection surface F, as illustrated in FIG. 6. Referring to FIG. 3, numeral 10 denotes a scanning range (scanning plane) of the scanner of the distance measuring device 9. When the thus scanned laser light hits an object (such as fingers), the laser light is then scattered. By providing the beam splitter 27 and the light detector 15, light reflected from the object can be guided to the light detector. Specific examples of the light detector include photodiodes. Needless to say, the photodiode used as the light detector 15 preferably has a high sensitivity to the infrared light emitted by the light source (laser diode).

The distance between the distance measuring device and the object is determined using a TOF method. Specifically, output of the infrared laser 11 is modulated into pulsed output, or output with a sine waveform or a rectangular waveform. There is a time difference between the waveform of the infrared laser returned to the photodiode 15 and that of the output infrared laser light. The time difference TD is represented by the following equation:

$$TD = 2 \times D/C,$$

wherein D represents the distance between the distance measuring device and the object, and C represents the velocity of light.

Figure 7:
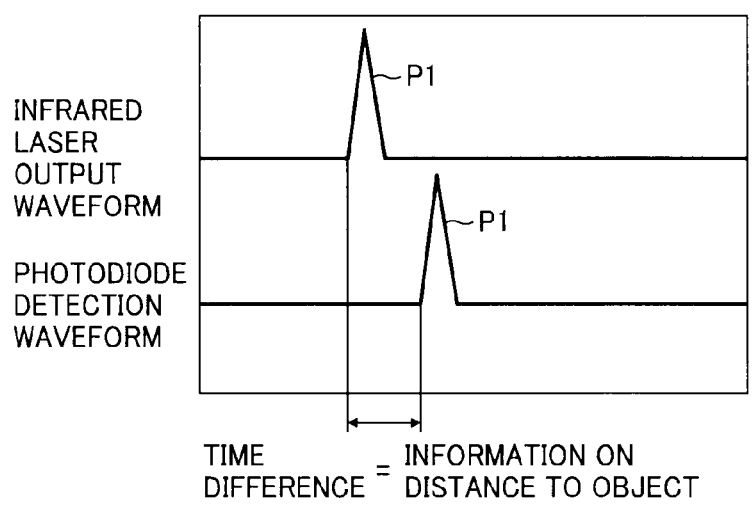
FIG. 7 is a view for explaining a Time of Flight (TOF) method used for the distance measuring device.

Thus, by determining the time difference (TD), the distance (D) between the distance measuring device and the object can be determined. As illustrated in FIG. 7, the time difference TD is determined as the time difference between a pulse P1 of the infrared laser output waveform and a pulse P2 of the photodiode detection waveform.

Thus, the position in a distance measuring direction DR (illustrated in FIG. 6) in a plane represented by a polar coordinate system can be determined by a TOF method. In addition, the position of the object (such as finger) in a scanning direction DE of the distance measuring device can be determined depending on the movement of the MEMS mirror 13. The position where the scanner scans in the scanning direction DE can be determined on the basis of the driving signal for the MEMS mirror 13 if the relationship between the information (e.g., phase difference) on the movement of the MEMS mirror and the driving signal for the MEMS mirror is previously determined.

Needless to say, the output from the projector module 7 is similar to the output mentioned above.

It is preferable that as illustrated in FIG. 3 the distance between the scanning plane 10 and the installation surface F (i.e., image projection surface) located below the scanning plane is about 1 mm. The object to be detected is, for example, a finger touching a portion of the projected image. In order to detect the finger touching a portion of the projected image, the distance between the scanning plane 10 and the image projection surface F is as short as possible. However, when the distance between the scanning plane and the projected image surface is too short, an object misdetection problem is caused if the projected surface F is a rough surface.

Figure 8:
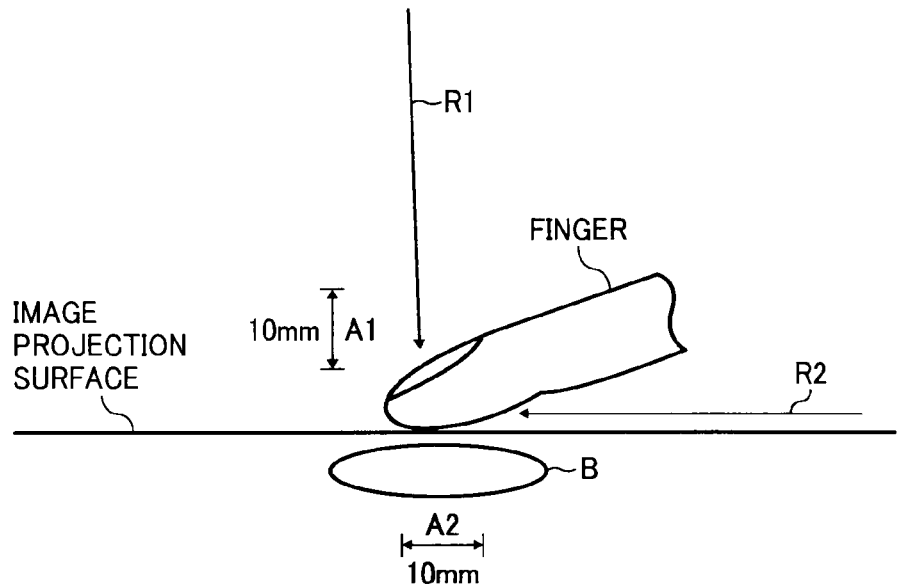
FIG. 8 is a view for explaining advantages of the electronics device in detecting a finger serving as an optical interceptor.
Figure 9:
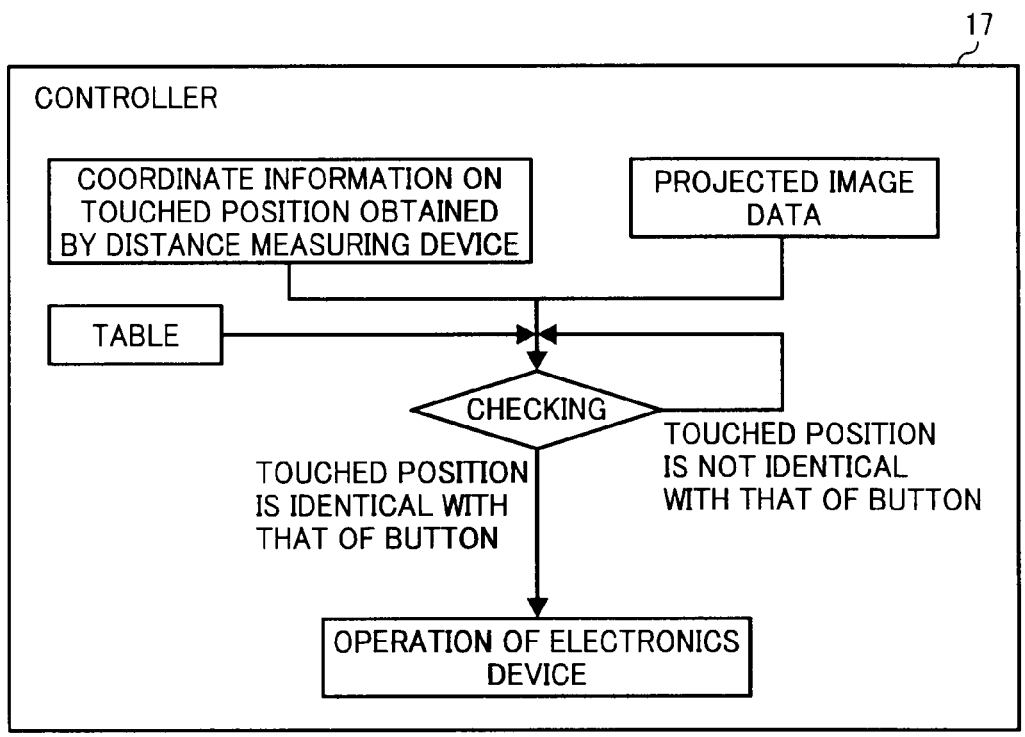
FIG. 9 is a block diagram illustrating the controlling operation of a controller of the electronics device.

There is a background desktop projector, which projects an image on a vertical wall and which detects the distance between the projector and the projected image. In such a background projector, whether a finger touches a portion of the projected image is determined by the distance data. Specifically, if it can be determined that the distance to the projected image (wall) is shortened by the height (10 to 15 mm) of a finger, it can be determined that the finger touches the portion of the projected image. However, the distance measuring accuracy of high precision TOF methods is about ±10 mm. Therefore, it is difficult for the method to securely determine whether a finger touches a portion of the projected image. Namely, misdetection will occur. In FIG. 8, R1 denotes a distance detection direction of such a background projector.

In contrast, by using the above-mentioned technique of the present invention, it can be clearly determined whether a finger touches a portion of the projected image. In other words, unless a finger enters on the scanning plane 10 of the scanner of the distance measuring device 9, detection cannot be performed. Therefore, judgment of intentional touch of a finger can be easily made by the present invention. In order that the detection result is hardly influenced by an error of a TOF method, the portion (i.e., a button B) to be touched by a finger preferably has a considerable size as illustrated in FIG. 8. In FIG. 8, R2 denotes a distance detection direction of the electronics device of the present invention.

As mentioned above, the projector scanner serves as the scanner of the distance measuring device 9. Namely, it is unnecessary to provide a scanner exclusive to the distance measuring device 9. Thus, the distance measuring device 9 is constituted of the infrared laser 11, and the photodiode 15 (and the reflecting mirror 29, if desired). Therefore, the distance measuring device 9 has low costs and can securely detect whether a finger touches the button B.

Since only one optical window, through which infrared laser light exits from the mobile phone 1 and reflected laser light enters thereinto, is provided on the mobile phone, the mobile phone has a simple design (namely, deterioration in design of the mobile phone can be prevented). In contrast, the above-mentioned electronics devices projecting a virtual keyboard have to have two optical windows because a CCD camera is used. Thus, the electronics device of the present invention has an advantage over the background electronics devices in this point.

As mentioned above, the distance measuring device 9 specifies the position of the object on a two-dimensional plane using a polar coordinate system. In contrast, an X-Y coordinate system is used for the data of an image to be projected by the projector module 7 as illustrated in FIG. 6. Needless to say, data in a polar coordinate system have one-to-one relation with data in an X-Y coordinate system, and they are convertible to each other.

The controller 17 compares the thus obtained positional information of the object with the image projected by the projector module 7. The role of the controller 17 will be explained by reference to FIG. 9.

The controller 17 has a table in which polar coordinate data obtained by the distance measuring device 9 (i.e., positional information of the object) are correlated with X-Y coordinate data of the image projected by the projector module 7. By using the table, the controller specifies the position of a portion of the projected image, which portion is touched by the object (finger). When the position of the touched portion is identical to that of the predetermined portion to be touched, the controller 17 allows the projector module 7 or the mobile phone 1 to operate according to the instruction provided by the touching operation.

Figure 10A:
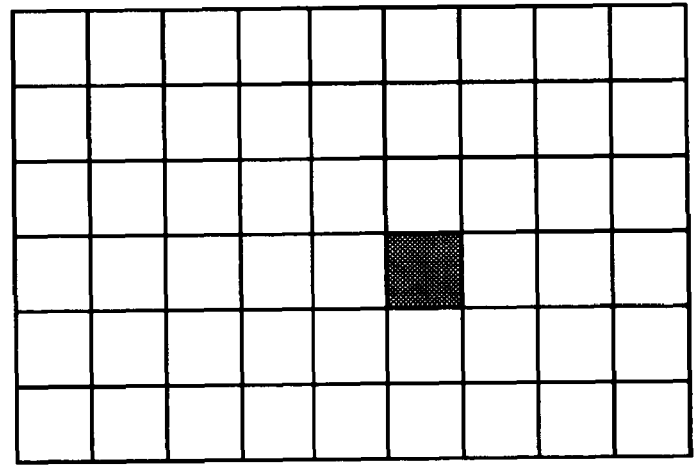
FIGS. 10A and 10B are views for explaining whether or not touching is performed by an optical interceptor.
Figure 10B:
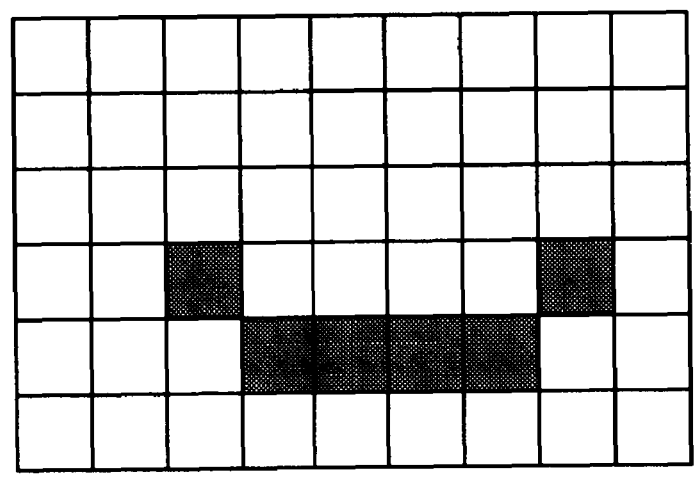

The distance measuring device 9 determines whether an object (finger) touches a portion of a projected image. In this regard, it is a problem that a foreign material present on the image projection surface F is detected as an object. Therefore, it is preferable that the object to be detected has a considerable size. Namely, as illustrated in FIG. 10B, it is necessary for the positional data obtained by the distance measuring device 9 to have an area not less than a predetermined area. The area is determined depending on the size of a finger or the size of an indicator (pointer) to be used. In addition, in order to lessen the influence of electric noises, it is necessary that the same area (e.g., the black-color portions in FIG. 10B) is detected for a time not shorter than a predetermined time (for example, 0.5 or 1 second). The time is preferably determined in consideration of operationality. In addition, if it is desired to detect that an object (finger) traces a portion of the projected image, a judgment such that the detected area continuously moves is performed. Such detection can be easily performed using information processing techniques As mentioned above, the controller 17 has a table in which polar coordinate data obtained by the distance measuring device 9 are correlated with X-Y coordinate data of the image projected by the projector module 7. The table is prepared by a correction device 19.

Next, flow of the operation of the correction device 19 will be explained by reference to FIG. 11.

When a correction operation is started, the projector module 7 displays an image having a portion to be touched. Specifically, an image having a mark (◎) and a message to press the mark is projected. When the distance measuring device 9 detects that the mark is touched by an object (e.g., finger) and the position of the touched portion is specified, the controller 17 determines whether or not the touch is an effective touch. If the touch is determined to be an effective touch, the coordinate of the touched portion is stored. Next, the project module 7 displays another image having the mark (◎) at a different position and a message to press the mark are displayed. The operations mentioned above are repeated. Thus, the two different positions of the projected mark (◎) are compared with the positions of the actually touched portions determined by the distance measuring device 9. In this case, a new table can be prepared to match the detected coordinate data with the coordinate data of the projected image (i.e., to relate the detected coordinate data to the coordinate data of the projected image using the thus obtained positional information and magnification information (i.e., positional difference information)).

By performing the above-mentioned operations, the table in which polar coordinate data obtained by the distance measuring device 9 are correlated with X-Y coordinate data of the image projected by the projector module 7 is prepared by the correction device 19, and the table is stored in the controller 17. In this regard, the distance between the two different positions of the mark (◎) is as long as possible in each of the X and Y directions to prepare a table with high precision.

Figure 12:
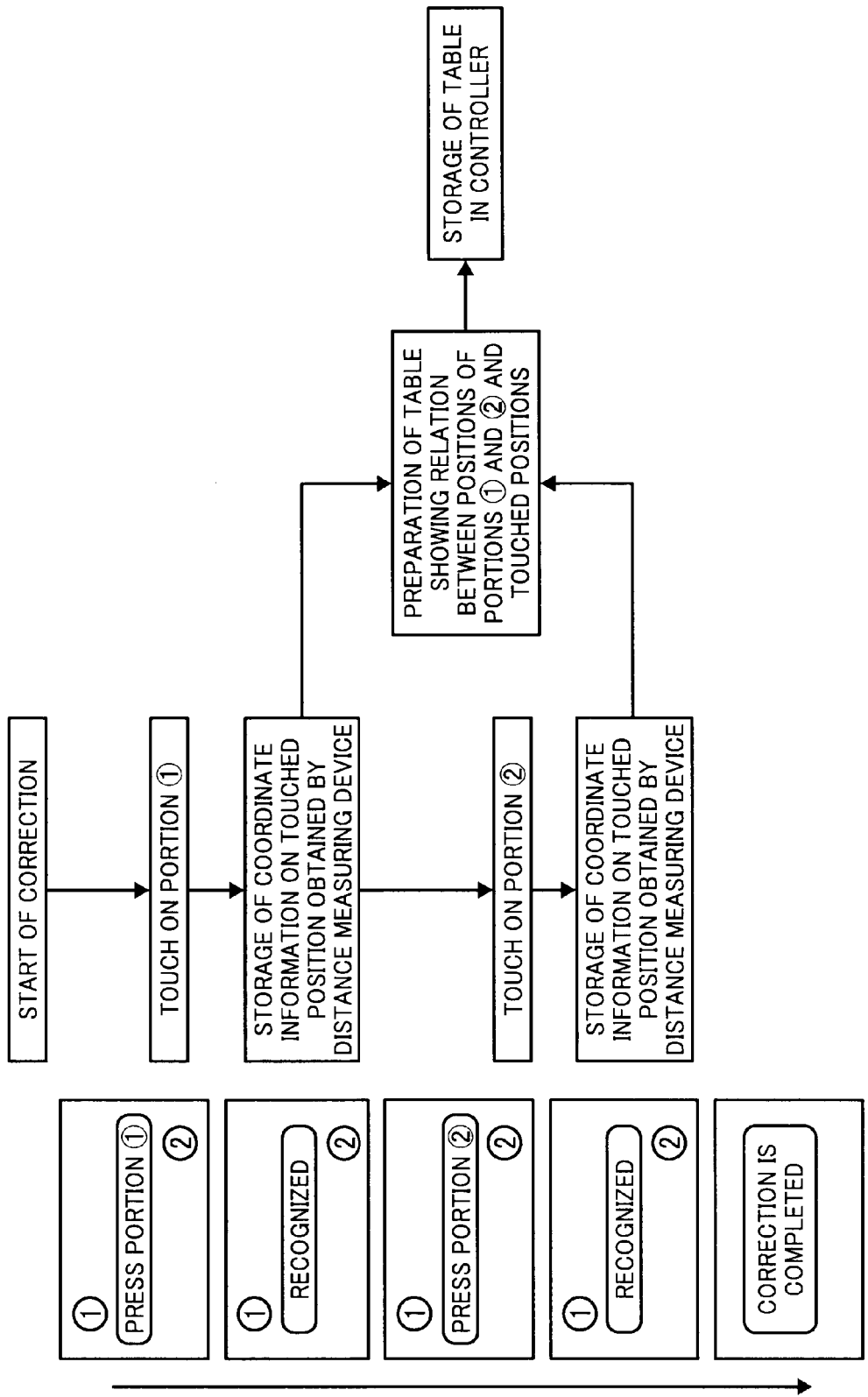

The correction method is not limited to the above-mentioned method. For example, a method illustrated in FIG. 12 can also be used. The correction image illustrated in FIG. 12 includes two different portions ① and ②. As illustrated in FIG. 12, it is requested to touch the portion ①, followed by touching the portion ②. In this regard, it is preferable that when touching is recognized, the color of the touched portion is changed. In addition, the number of the touch portions is not limited to two, and may be three or more. For example, when the slope of a line obtained by the touched-portion data in the polar coordinate system is different from that of a line obtained by the image data in the X-Y coordinate system, it is preferable to perform the correction operation using three or more touch portions. However, there are electronics devices having characteristics so as not to cause such a different slope problem. In these devices, the two-portion correction is preferably used. Thus, the number of the touch portions is determined depending on the characteristics of the electronics device.

The correction operation is performed before shipment of the electronics device from a factory, namely the correction table is prepared and stored in the device before shipment. However, there is a case where the relation between the touched-portion data in the polar coordinate system and the image data in the X-Y coordinate system changes, for example, when environmental conditions change, and/or the electronics device is used for a long period of time. In such a case, it is preferable to perform the correction operation mentioned above.

The correction device 19 is necessary for electronics devices capable of changing the projection direction, and can produce good effect thereon. In addition, the correction device 19 is effective in such a case that the image projection surface is slanted or curved. However, when the image projection surface is seriously curved, a problem in that the distance measuring device does not well function may occur. Therefore, the image projection operation should be performed on an image projection surface, which is not seriously curved or slanted.

Figure 13A:
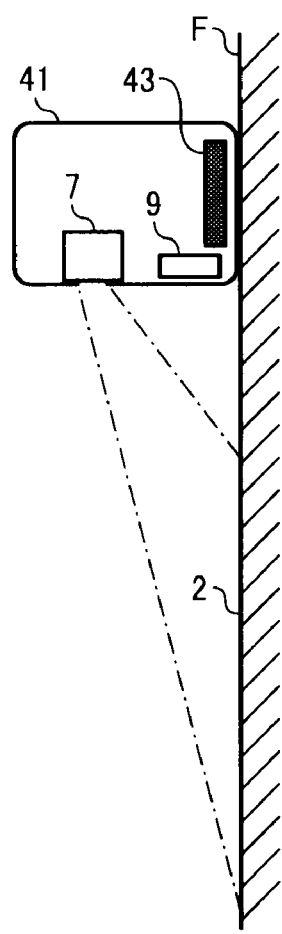
FIGS. 13A and 13B are views illustrating another example of the electronics device of the present invention.
Figure 13B:
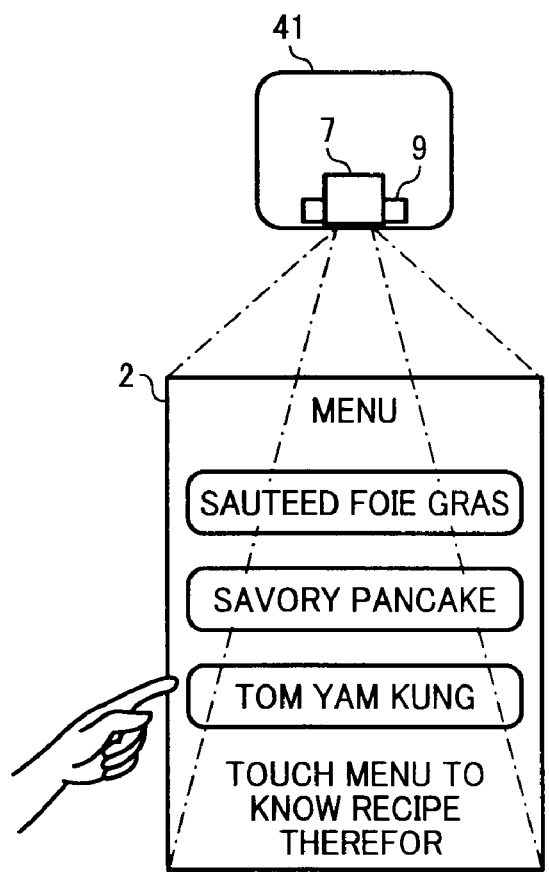

FIGS. 13A and 13B illustrate another example of the electronics device of the present invention. In FIGS. 13A and 13B, the same parts as those mentioned above have the same reference numbers. Therefore, detailed explanation of the parts is hereinafter omitted, and only the different portion will be explained in detail.

In this example, the installation surface F (image projection surface) is a vertical surface. For example, the image projection surface is a surface of a white board or a vertical surface of a refrigerator, which is constituted of a ferromagnetic material attracted to a magnet. Specifically, an electronic device 41 includes a magnetized member 43 having magnetism (such as magnets), which is located in a lower portion of the device so that the device can be fixedly set on the installation surface F. Thus, an image can be projected on a vertical surface. In this regard, since the electronics device 41 has an advantage of lightweight, vertical surface projection can be performed. By thus projecting an image on a vertical surface of a whiteboard, a meeting can be efficiently performed. In addition, by projecting an image such as recipes on a vertical surface of a refrigerator, cooking can be easily performed even in a small kitchen utilizing the recipe image without using a bulky recipe book.

Figure 14:
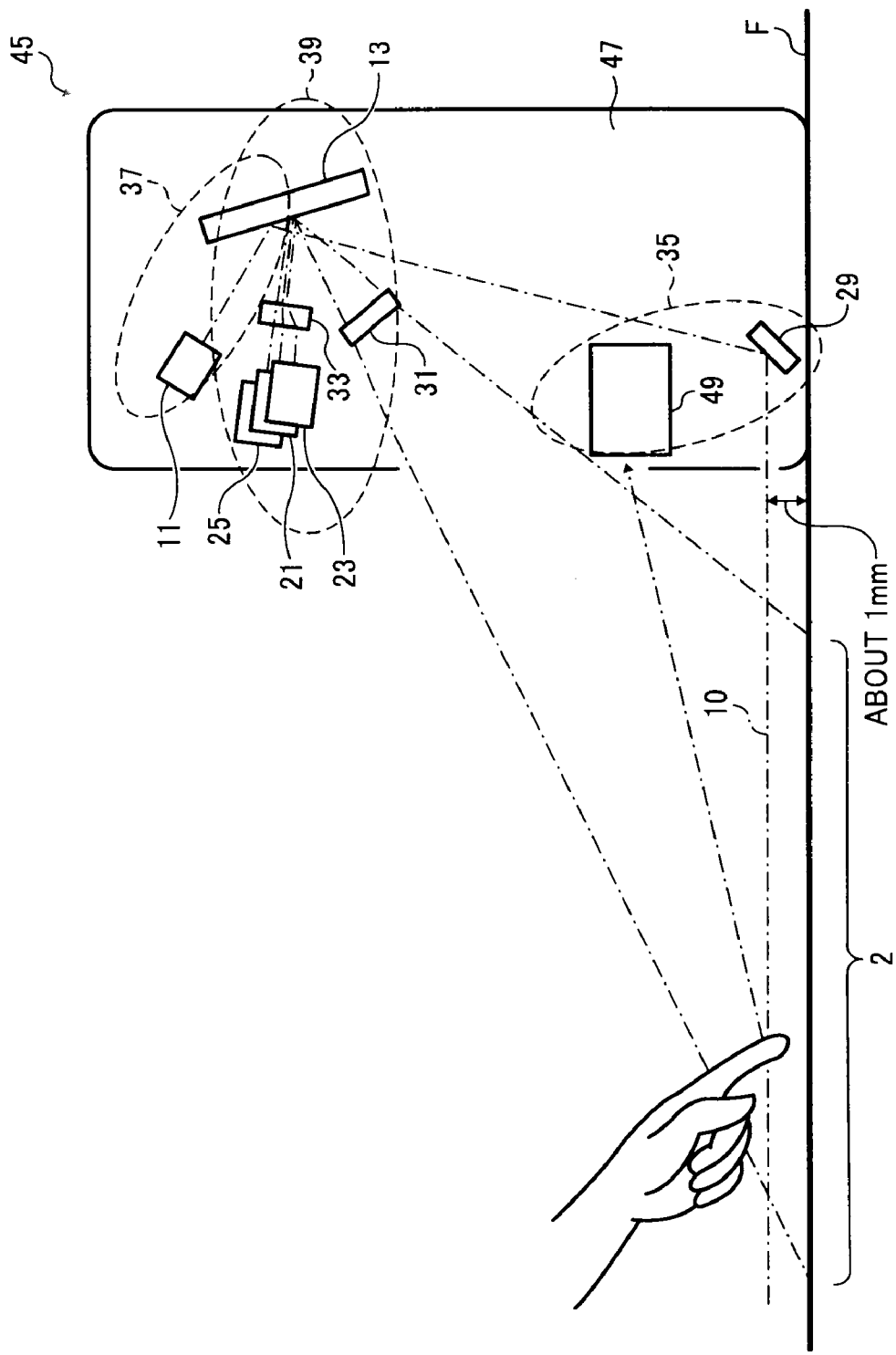
FIG. 14 is a view illustrating yet another example of the electronics device of the present invention.
Figure 15:
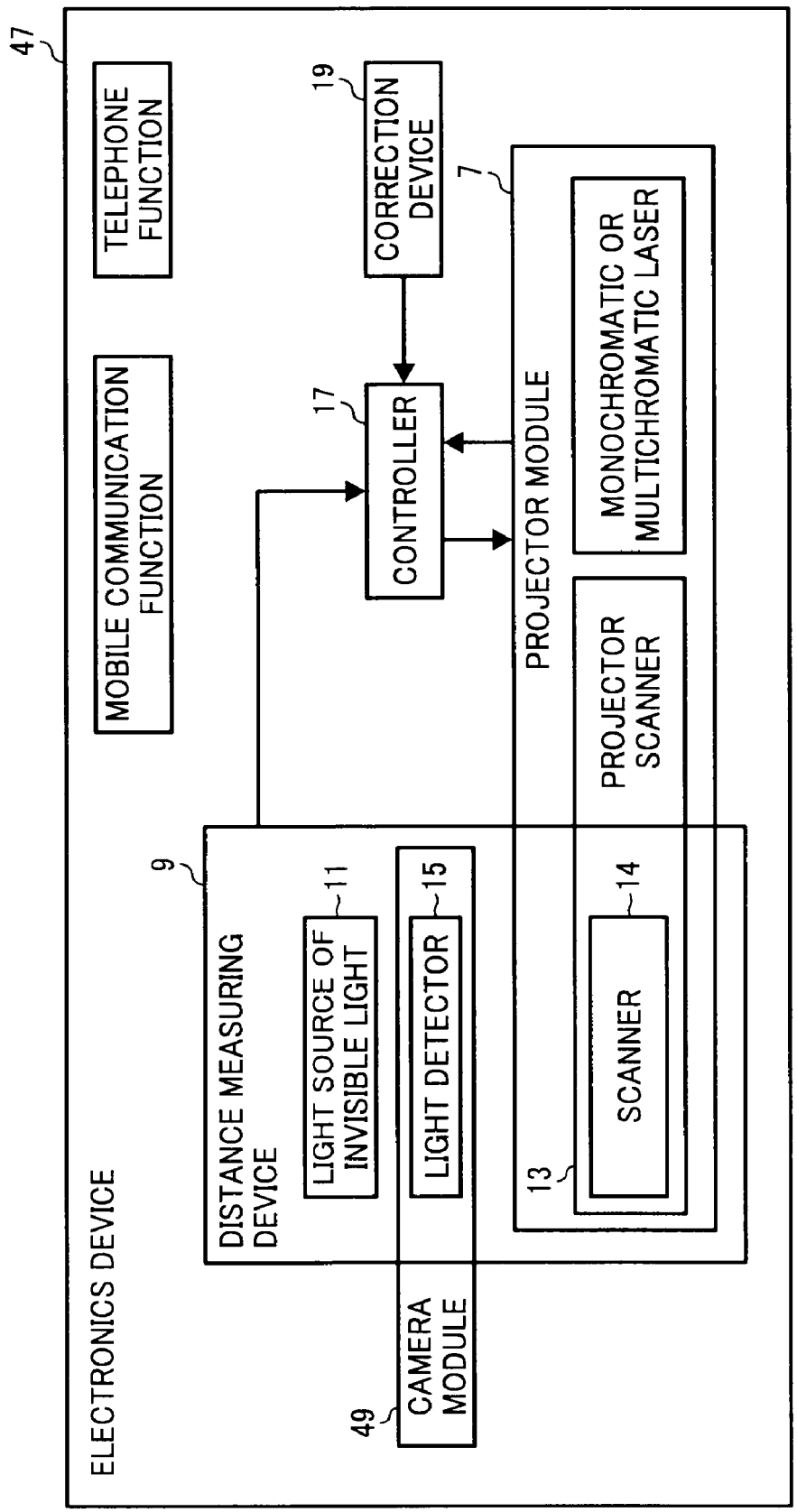
FIG. 15 is a block diagram of the electronics device illustrated in FIG. 14.

FIGS. 14 and 15 illustrate a third example of the electronics device of the present invention.

In the third example, an upper portion 47 of a mobile phone 45 includes a camera module 49 serving as a light detector of the distance measuring device 9. Since recent mobile phones typically have a camera module, such a camera module can be used as a light detector. Namely, the costs of the electronics device can be reduced because it is unnecessary to additionally provide a light detector. The electronics device illustrated in FIGS. 14 and 15 is a mobile phone having a camera module, but the present invention can also be used for digital cameras having a projector module.

The camera module 49 detects the distance to an object using the TOF method mentioned above. The camera module has a CCD sensor or a CMOS sensor having plural pixels. An infrared laser beam emitted by the mobile phone and scattered after hitting an object is received by a part of the plural pixels, thereby determining the distance to the object using the TOF method. The position of the object on a two dimensional plane can be specified on the basis of the infrared laser scanning position and the thus determined distance to the object.

Figure 16:
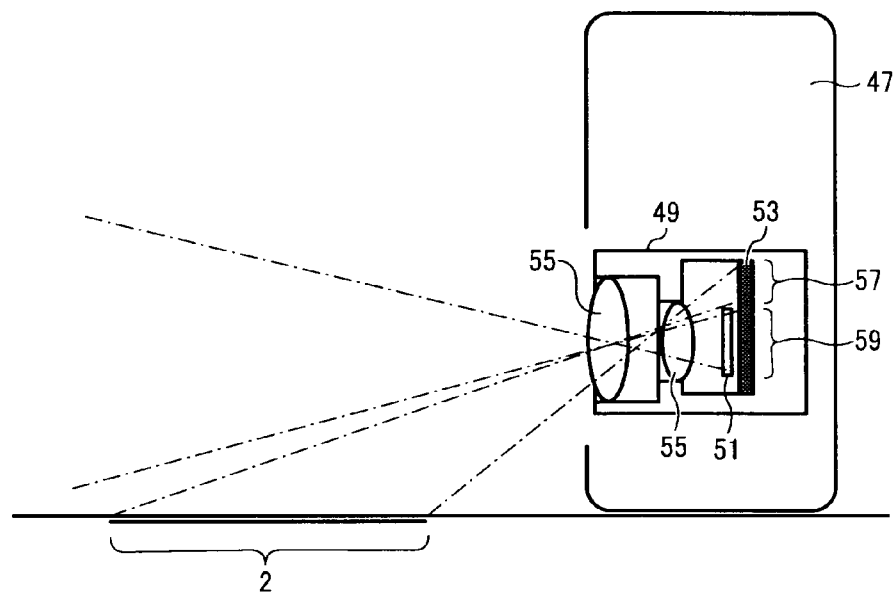
FIG. 16 is a longitudinal section illustrating a camera module of the electronics device illustrated in FIG. 14.
Figure 17:
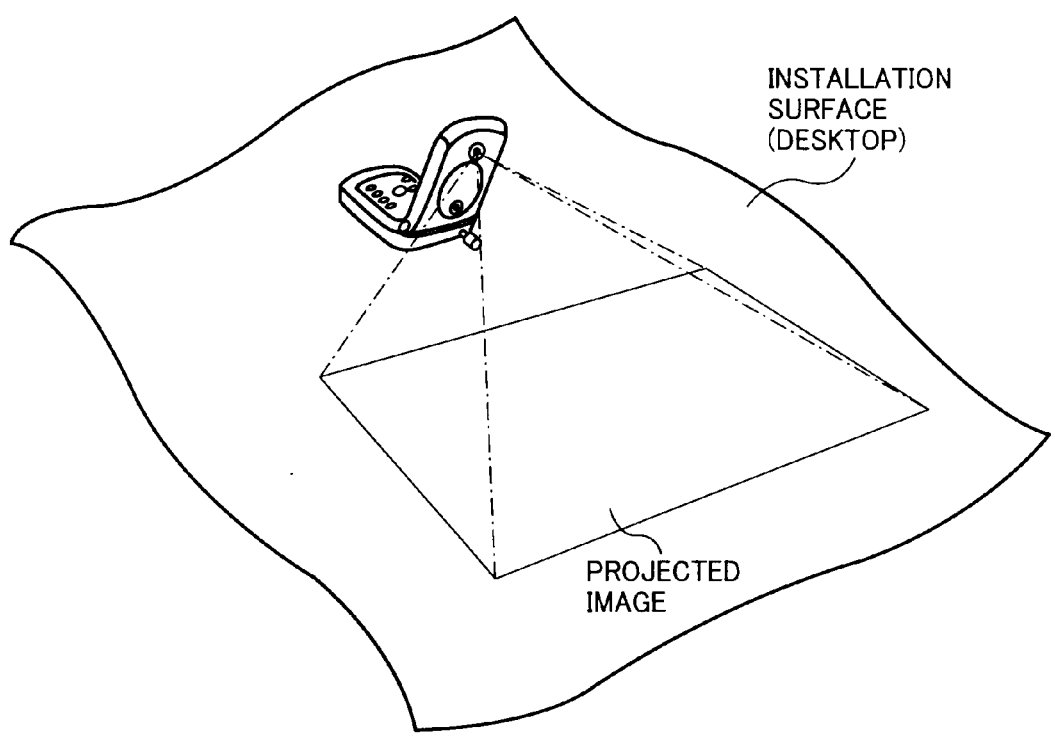
FIG. 17 is a perspective view illustrating a mobile phone projecting an image on a desk.

In general, CCD sensors and CMOS sensors, which can be used for the camera module 49, use an infrared cut filter to cut infrared rays in the air, which are noises. Therefore, such camera modules cannot be used. In order to avoid such a problem, such a camera module 49 as illustrated in FIG. 16 is used. Referring to FIG. 16, numerals 51, 53 and 55 denote an infrared cut filter, a pixel sensor, and a lens system. In addition, numerals 57 and 59 denote an infrared sensor region of the sensor used for the distance measuring device, and a camera region of the sensor used for the camera. As illustrated in FIG. 16, the infrared cut filter 51 is used for the camera region, but is not used for the infrared sensor region 57. Therefore, the infrared laser beam scattered by hitting the object can be received by the infrared sensor region 57. Thereby, the distance to the object can be determined.

In this regard, the image 2 projected by the projector module 7 has to be focused on the infrared sensor region 57. Since the focus position changes depending on the zoom condition of the camera module 49, the zoom condition of the camera module 49 is set to such a predetermined condition that the image 2 projected by the projector module is focused on the infrared sensor region 57.

Figure 18:
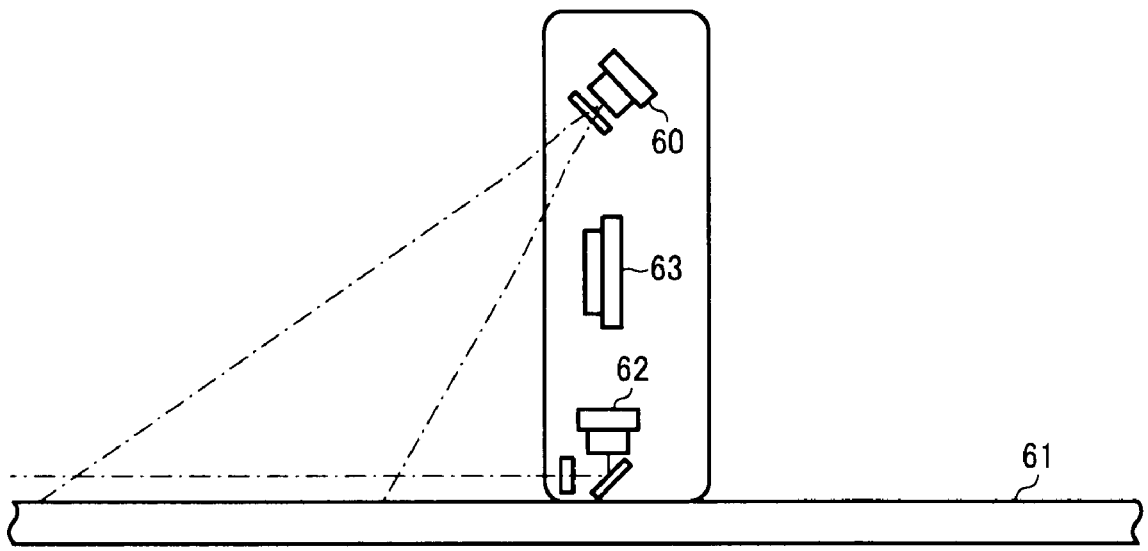
FIG. 18 is a view for explaining a touching operation on a virtual keyboard of a background electronics device.

Instead of using the TOF method, the position determining method mentioned above by reference to FIG. 18 can also be used. Specifically, the position of an object on a two-dimensional plane may be determined by the address of the portion of the pixel sensor receiving infrared light scattered by hitting the object.

As mentioned above, according to the present invention, recognition error of an input operation can be reduced without providing a scanner exclusive for the distance measuring device, resulting in cost reduction.

A low-cost photodiode can be used as a light detector of the distance measuring device instead of a high-cost CCD sensor, resulting in further cost reduction.

Even in a case where the image data are not matched with the input positional data, correction can be made. Therefore, even when the environmental conditions and/or the conditions of the electronics device change, the input operation to the projector module can be precisely performed.

The electronics device of the present invention can be set on installation surfaces other than horizontal surfaces and images can be projected on surfaces other than horizontal surfaces, if the installation surfaces include a ferromagnetic material.

This document claims priority and contains subject matter related to Japanese Patent Application No. 2008-110496, filed on Apr. 21, 2008, incorporated herein by reference.

Having now fully described the invention, it will be apparent to one of ordinary skill in the art that many changes and modifications can be made thereto without departing from the spirit and scope of the invention as set forth therein.

What is claimed as new and desired to be secured by Letters Patent of the United States is:

1. An electronics device comprising:
   a projector module configured to project a two-dimensional image, including:
      a first light source configured to emit a first laser beam selected from monochromatic laser beams and multichromatic laser beams; and
      a first scanner configured to scan an image projection surface with the first laser beam in a biaxial direction to project the two-dimensional image on the image projection surface, including:
a uniaxial-scanning component rotatable on one axis; and
a biaxial-scanning component rotatable on two axes;
a distance measuring device configured to perform one-dimensional scanning to determine a distance to an optical interceptor, including:
a second light source configured to emit a second light beam;
a second scanner configured to perform the one-dimensional scanning with the second light beam, wherein a uniaxial-scanning component of the second scanner is the same uniaxial-scanning component of the first scanner;
a light detector configured to detect the second light beam reflected from the optical interceptor; and
a controller,
wherein a scanning plane defined by a second light beam scanning direction and a second light beam traveling direction is parallel to the image projection surface, and the scanning plane covers at least the entire two-dimensional image,
wherein positional data obtained by the distance measuring device are two-dimensional coordinate data in the second light beam scanning direction and the second light beam traveling direction, and are compared with two-dimensional coordinate data of the two-dimensional image to determine a position of the optical interceptor on the two-dimensional image,
wherein the controller allows the device to operate according to said comparison when determining that the optical interceptor performs optical interception in a portion of the two-dimensional image, which portion has an area not less than a predetermined area, for a time not shorter than a predetermined time, and
wherein the distance measuring device determines the distance to the optical interceptor using a Time of Flight method, which determines the distance on the basis of a time difference between a pulse of the second light beam emitted by the second light source and said pulse of the second light beam detected by the light detector.

2. The electronics device according to claim 1, wherein the second light beam is an invisible light beam.

3. The electronics device according to claim 1, further comprising:
a correction device configured to relate the positional data of the optical interceptor obtained by the distance measuring device with the two-dimensional coordinate data of the two-dimensional image projected by the projector module.

4. The electronics device according to claim 3, wherein the correction device performs correction using a method including:
projecting one or more correction images including at least two touch points using the projector module;
determining positional data of the optical interceptor touching the at least two touch points using the distance measuring device; and
comparing the positional data of the at least two touch points touched by the optical interceptor with the positional data of the at least two touch points in the two-dimensional coordinate data to determine whether the data are matched with each other.

5. The electronics device according to claim 1, further comprising:
a magnetized member configured to set the electronics device on an installation surface including a ferromagnetic material.

6. The electronics device according to claim 1, wherein the electronics device has a wireless communication function.

7. The electronics device according to claim 1, wherein the electronics device has a telephone function.

* * * * *